United States Patent
Burridge et al.

(10) Patent No.: US 7,328,158 B1
(45) Date of Patent: Feb. 5, 2008

(54) SYSTEM AND METHOD FOR ADDING SPEECH RECOGNITION TO GUI APPLICATIONS

(75) Inventors: Richard N. Burridge, Redwood City, CA (US); William D. Walker, Hollis, NH (US); Peter A. Korn, Oakland, CA (US); Oliver Braun, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 834 days.

(21) Appl. No.: 10/412,432

(22) Filed: Apr. 11, 2003

(51) Int. Cl.
G10L 21/00 (2006.01)
(52) U.S. Cl. .................... 704/270; 704/375; 704/231
(58) Field of Classification Search ............. 704/255, 704/231, 270, 275
See application file for complete search history.

(56) References Cited

U.S. PATENT DOCUMENTS

| | | | |
|---|---|---|---|
| 5,384,892 A * | 1/1995 | Strong | 704/243 |
| 5,774,628 A * | 6/1998 | Hemphill | 704/255 |
| 6,662,163 B1 * | 12/2003 | Albayrak et al. | 704/275 |
| 6,839,669 B1 * | 1/2005 | Gould et al. | 704/246 |
| 2003/0009335 A1 * | 1/2003 | Schalkwyk et al. | 704/257 |
| 2003/0046074 A1 * | 3/2003 | Ruback et al. | 704/255 |

* cited by examiner

Primary Examiner—Richemond Dorvil
Assistant Examiner—Qi Han
(74) Attorney, Agent, or Firm—Martine Penilla & Gencarella, LLP

(57) ABSTRACT

A system and method for adding speech recognition to graphics user interface based applications for a computer system is described. The speech recognition system provides a profile generation module that enables users to create editable profiles of grammar and corresponding actions that may be used by a speech agent and in combination with an accessibility framework to drive that application based on the user's spoken commands.

26 Claims, 4 Drawing Sheets

SYSTEM AND METHOD FOR ADDING SPEECH RECOGNITION TO GUI APPLICATIONS

CROSS REFERENCE TO RELATED APPLICATION

This application is related to Richard Burridge, co-filed U.S. patent application Ser. No. 10/412,122, filed on Apr. 11, 2003, titled "SYSTEM AND METHOD FOR DEPLOYMENT OF SPEECH RECOGNITION GRAMMAR". To the extent not repeated herein, the contents of this patent application are hereby incorporated herein by reference.

FIELD OF THE INVENTION

The present claimed invention relates generally to the field of computer operating systems. More particularly, embodiments of the present claimed invention relate to a system for facilitating adding speech recognition to graphics user interface applications.

BACKGROUND ART

A computer system can be generally divided into four components: the hardware, the operating system, the application programs and the users. The hardware (e.g., central processing unit (CPU), memory and input/output (I/O) devices) provides the basic computing resources. The application programs (e.g., database systems, games, business programs (database systems, etc.) define the ways in which these resources are used to solve computing problems. The operating system controls and coordinates the use of the hardware resources among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

The Unix operating system consists of two separable parts: the "kernel" and the "system programs." Systems programs consist of system libraries, compilers, interpreters, shells and other such programs that provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are used by the programmer to communicate with the kernel to extract computer resource information. The robustness of the Unix kernel allows system hardware and software to be dynamically configured to the operating system while applications programs are actively functional without having to shut-down the underlying computer system.

The kernel and system programs consist of a machine-code representation of programs developed in a higher-level language, such as C, C++, or assembly language. These programs make use of data structures—a structured grouping of program data, the order and composition of which are essential to understanding the data structures. This ordering and composition information is used during a compilation process—the translation of programs from high-level languages to machine code. During the compilation of optimized code, such as that used for the Unix kernel and system programs, the ability to easily extract this information from the resulting program objects or modules objects is lost.

As computers become networked and the addition of a variety of applications to the computer network become a mainstay of many computing environments, the relationship between the operating system and user applications have become a critical component in determining the right user interfaces to these applications to encourage the ease of use while ensuring system integrity and efficiency. In recent times, many computing devices have being adding various programs to diversify the applicability of the tradition computing notion to new devices. One of such programs is speech recognition programs that operate within the operating system's speech subsystem.

FIG. 1 is a block diagram illustration of an exemplary prior art computer system 100 that is configurable to perform speech recognition in a network connected applications based on speech recognition grammars stored in either a network connected server or in a network connected client device. As shown in FIG. 1, the computer communication network 100 includes a speech server having speech recognition grammar stored in it and networked connected applications 130 communicatively linked to each other through the computer network system 100. The computer network system 100 further includes central processing unit 110, memory 120, applications 130, operating system 150, storage device 160 and I/O device 170.

The computer system 100 can also include audio circuitry 180 suitable for receiving and processing analog audio signals into digitized speech data for use in a speech recognition system. The audio circuitry 180 also can be used to synthesize digital speech data into analog speech signals. Thus, the audio circuitry 180 can be used in the same fashion as a convention sound card. The speech server 140 has a grammar recognition grammar stored in it and applications 130.

An exemplary operation of the grammar speech recognition module 140 is described in "Ruback, Harvey M.; et al., U.S. patent application, entitled "Selective enablement of speech recognition grammars" Serial No.: 20030046074, filed on Jun. 15, 2001. To the extent not repeated herein, the contents of this patent application are hereby incorporated herein by reference.

The computer system 100 is further connected to an external storage device 160 and to an external drive device 170 through which computer programs can be loaded into computer system 100. The external storage device 160 and external drive 170 are connected to the computer system 100 through respective bus lines. The computer system 100 further includes main memory 130 and processor 110. The drive 170 can be a computer program product reader such a floppy disk drive, an optical scanner, a CD-ROM device, etc.

FIG. 1 additionally shows memory 130 including a kernel level memory. Memory 130 can be virtual memory which is mapped onto physical memory including RAM or a hard drive, for example. In the computer system described in FIG. 1, programmers add speech recognition to their applications by manually modifying the speech recognition source code in the speech recognition system 140. This often involves a fair amount of development work and can be problematic.

These manual speech recognition source code operations, which are essential for enabling speech recognition in the computer system 100, results in programmers spending more time interacting with the speech recognition subsystem 140 rather than concentrating on developing better speech user interfaces. Furthermore, in the computer system shown in FIG. 1, the speech subsystem 140 automatically "speech-ifies" an application by using methods such as remote object models or pre-programmed speech grammar stored in the speech subsystem 140. This results in user interfaces tending to be stiff and difficult to use and uncompelling to users because they provide limited customization of grammar phrases the user may use.

The prior art system in FIG. 1, generally performs object-specific operations and further limits the ability for the user to perform application specific speech recognition operations. The system shown in FIG. 1, further does not allow user to generate grammar profiles for applications via a software analysis of the application.

SUMMARY OF INVENTION

Accordingly, to allow graphic user interface based speech recognition to be included in the kernel level memory and in user applications without degrading the performance of the computer system, a need exists to develop a new speech recognition grammar system that dynamically adds speech recognition features to existing and new user graphics interface applications. This new speech recognition system will remove the duplication present with the prior art, and will facilitate programmatic analysis of speech profiles according to defined user requests for application specific operations. A further need exists to use speech encoding mechanism in system programs and user applications.

What is described herein is a computer system that provides a technique for dynamically encoding speech recognition to existing and new graphic user interface user applications. Also described is a technique for including this encoded information in a kernel, system programs and user applications, as well as techniques for extracting this information for use in application-specific program analysis. Embodiments of the present invention allow programmers to automatically generate this encoding within a graphics user interface process for these programs. Embodiments of the present invention allow programmers to extract and utilize the user application-specific information included within the encoding for customizing the user interface.

The invention provides users with speech recognition encoding which can be used to dynamically create user editable profiles that can be processed by a speech agent in the speech subsystem. Contained in the profiles are speech recognition grammars and actions to be taken in the application when the user utters a command. Traditionally, this kind of information is generated by a speech subsystem without any user involvement as to how to interact with a particular application.

Embodiments of the present invention further include accessibility framework system that enables the speech recognition system to perform application-specific operations. The framework system further allows a speech agent to determine what actions are permissible by an application and the events needed to cause these actions. The framework system further enables the automatic generation of an extended grammar/action profile for a particular application.

Embodiments of the speech recognition system further include a profile generation module for generating user-specific grammar/action profiles for user applications that the user could further customize to make spoken words unique to a particular user more understandable to the underlying computer system. The profile information may be manually or automatically generated via a software analysis of the particular applications free of duplication.

Embodiments of the present invention also include a speech agent that reads the profile information created by the user for a particular application and uses it in combination with the accessibility framework module to drive applications based on the user's spoken word. This allows the developer to only have the know how to create a grammar/action profile either manually or by editing a profile generated by software analysis of the application.

Embodiments of the present invention further include a grammar generation module that generates speech recognition grammar and actions to be used by the user regarding any particular application with which the user is interacting.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to automatically generate speech recognition grammar for graphics user interface based applications. In accordance with an aspect of the invention, a speech recognition system provides a user composed editable profile information that can be processed by the speech subsystem for specific applications identified by the user.

Figure 1:
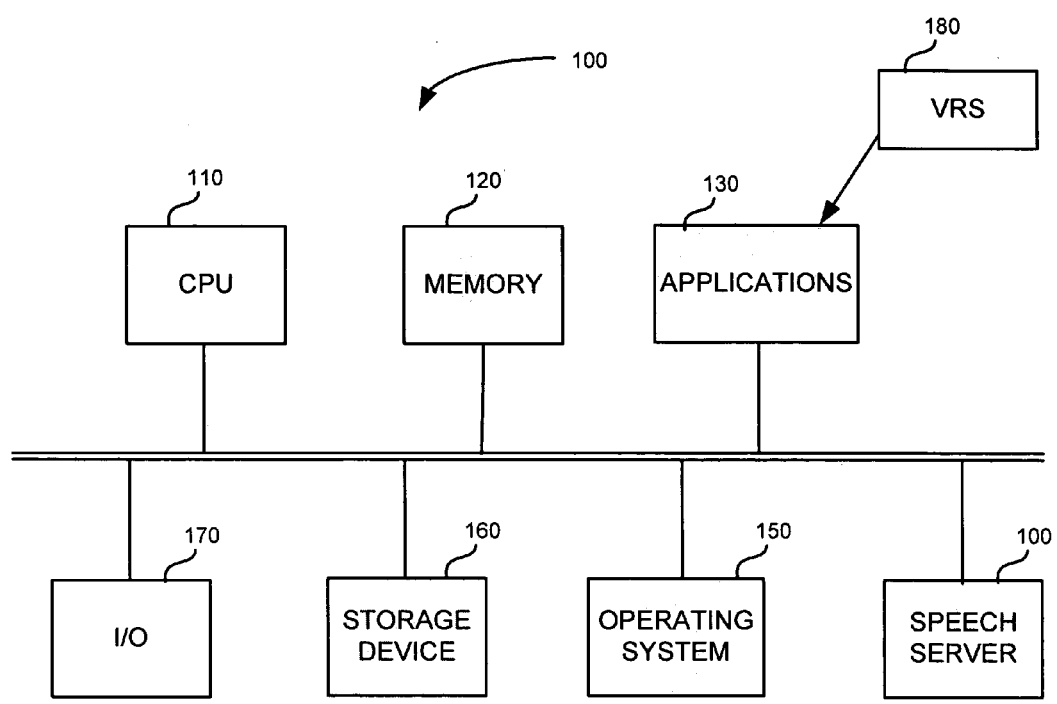
FIG. 1 is a block diagram of a prior art computer system.
Figure 2:
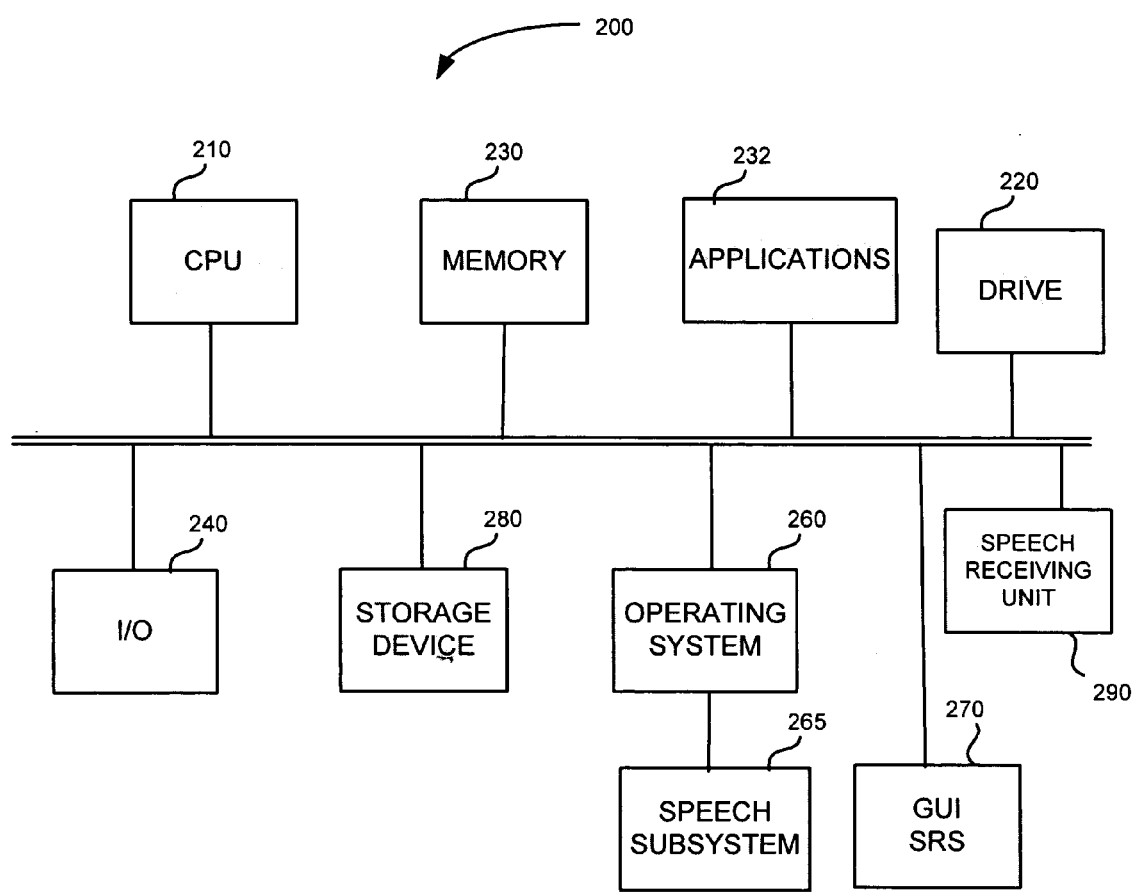
FIG. 2 is a block diagram of a computer system in accordance with an embodiment of the present invention.

FIG. 2 is a block diagram illustration of one embodiment of a computer system 200 of the present invention. The computer system 200 according to the present invention is connected to an external storage device 280 and to an external drive device 220 through which computer programs according to the present invention can be loaded into computer system 200. External storage device 280 and external drive 220 are connected to the computer system 200 through respective bus lines. Computer system 200 further includes main memory 230 and processor 210. Drive 220 can be a computer program product reader such a floppy disk drive, an optical scanner, a CD-ROM device, etc.

FIG. 2 shows memory 230 including a I/O 240 memory. Memory 230 can be virtual memory which is mapped onto physical memory including RAM or a hard drive, for example, without limitation. The computer system 200 further includes operating system 260 which includes a speech subsystem 265 that provides speech recognition capabilities to user using the computer system 200. The computer system 200 further comprises speech recognition system (SRS) 270 that provides speech-enabling capabilities to users to enable users to create application specific profiles that may be processed by a speech agent to allow corresponding applications 232 to perform specific actions in relation to specific commands provided by the user.

According an embodiment of the present invention, the speech recognition system 270 enables users to be involved in the decision making process for how to interact with specific applications with defined profiles in the computer system 200. With the user definable profile implementation, a user would only have to know how to create a grammar/action profile. Consequently, the user does not have to access the underlying speech recognition source code to add the specific speech features for the particular application.

Figure 3:
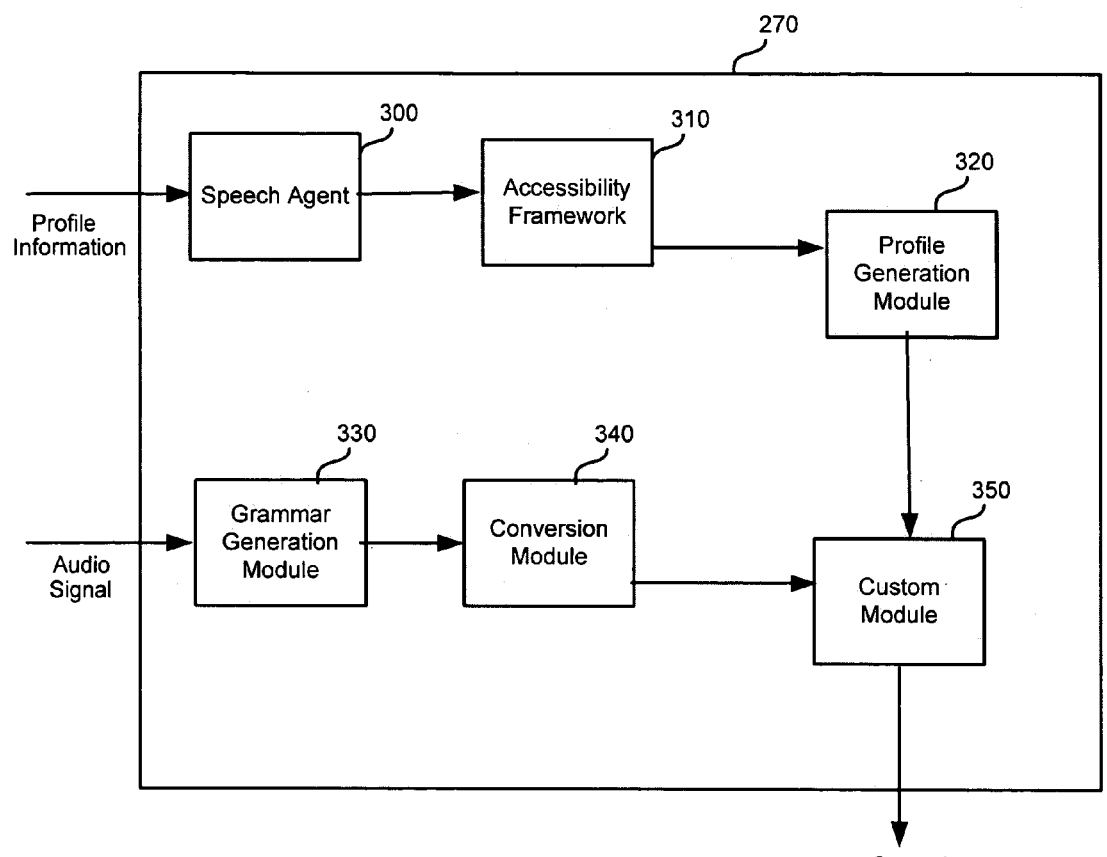
FIG. 3 is a block diagram of an embodiment of the speech recognition system (GUI SRS) in accordance with one embodiment of the present invention.

FIG. 3 is a block diagram illustration of the internal architecture of one embodiment of the speech recognition system 270 of the present invention. As shown in FIG. 3, the speech recognition system 270 comprises speech agent 300, accessibility framework module 310, profile generation module 320, grammar generation module 330, speech conversion module 340 and customization module 350. The speech recognition system 270 receives audio signals representative of sound received from an integrated microphone system (not shown) and the audio signals are digitally processed by the speech subsystem 265 in the operating system 260.

The speech agents 300 processes editable profiles created by a user of the speech recognition system 270. The speech agent 300 in combination with the accessibility framework module 310 uses information read from the user created profile(s) to drive a particular user application based on the user's spoken command(s). The accessibility framework module 310 further performs application specific operations, instead of object-specific operations to enable users to interact with speech-enabled applications. In one embodiment of the present invention, the accessibility framework module 310 permits the speech agent 300 to determine what actions are possible by an application and what events are needed to cause the actions.

The profile generation module 320 enables the user to automatically create application specific profiles of how the user intends or wishes to communicate with the application.

In one embodiment of the present invention, the profile information generated by the profile generation module 310 includes speech recognition grammars and actions to be taken in a particular application when the user utters a command. After the speech recognition system 270 creates a grammar/actions profile for an application, the user can further customize the profile information via the custom module 350 to make the spoken words more understandable to the underlying computer system.

In one embodiment of the present invention, a plurality of profiles may be created for a particular application. For example, instead of the need to edit a large automatically generated profile, the user may provide a small custom "override" profile that replaces grammar/action rules defined in the larger profile. The profile generation module 320 allows developers to only have to know how to create profile information for a particular application without needing access to the underlying application source code to implement speech recognition features for the particular application.

The grammar generation module 330 generates text in response to audio signals provided by the audio interface (not shown) to assist in determining the context of the audio signals to more accurate convert the spoken words via the conversion module 340 into text. The grammar generation module 330 stores a number of machine recognizable words and phrases from which that incoming audio signals or speech profile information of a particular may be converted.

Figure 4:
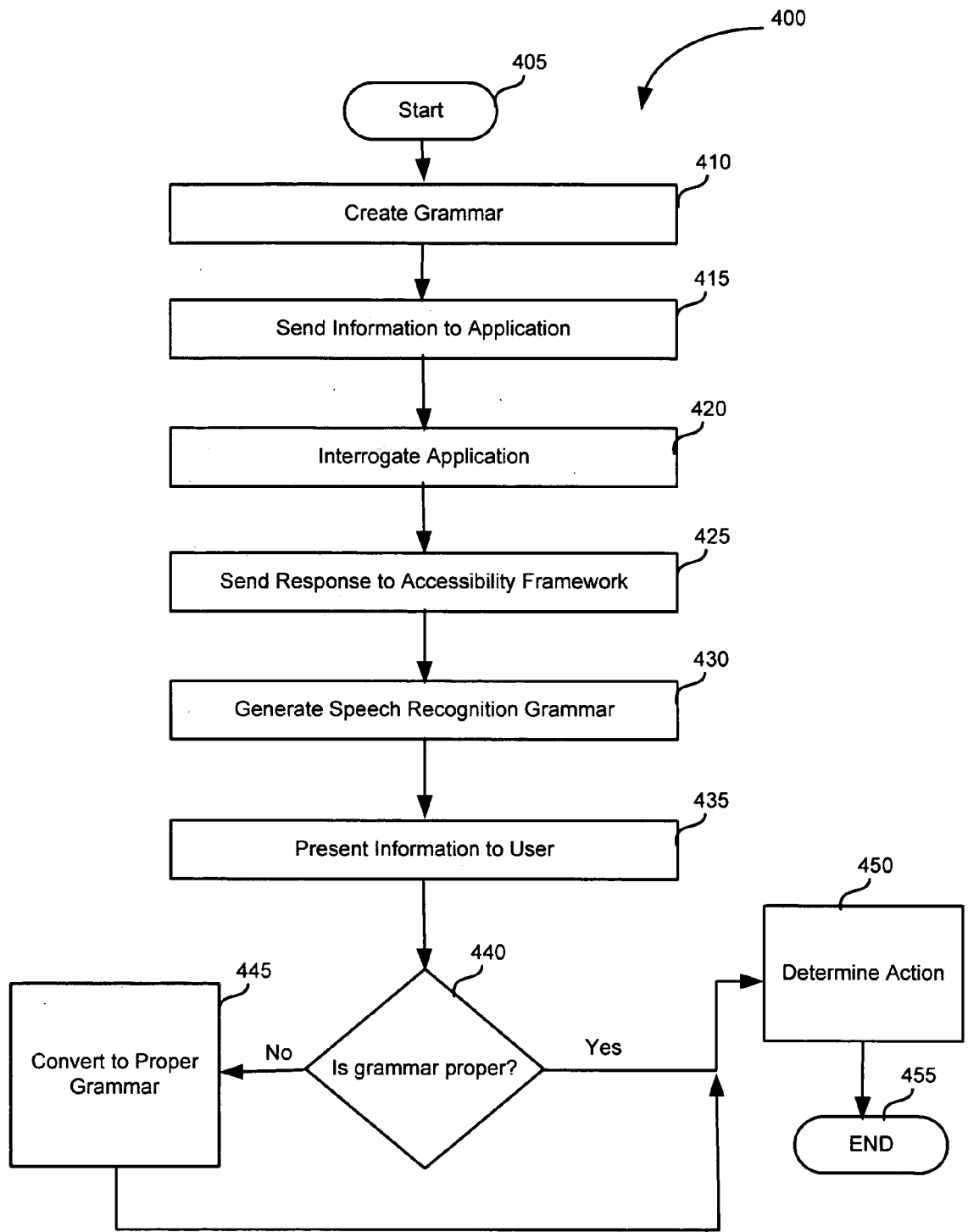
FIG. 4 is a flow diagram of one embodiment of a system data flow of an embodiment of the GUI SRS of the present invention.

FIG. 4 is a flow diagram illustration of one embodiment of adding 400 the speech recognition system of the present invention to a user application. As shown in FIG. 4, the method can begin in step 405 in which the speech recognition system 270 is initiated by a user to begin adding speech recognition to an existing or new application.

In step 410, the speech recognition system 270 allows the user to create user specific grammar for the particular application the user wishes to add speech recognition. In one embodiment of the present invention, users may add grammar to the speech recognition system 270 by defining editable speech profile information for one or more applications.

In step 415, the defined profile information is sent to the particular application to which the user intends to add speech recognition. And in step 420, the system recognition system 270 interrogates the application to determine if there are any specific speech features the user wishes to incorporate into the speech subsystem.

In step 425, the speech recognition system 270 send the interrogation response from the applications to the accessibility framework module 310 which will then use the information contained in the responses in combination with the profile information generated by the user to determine what actions to take. In step 430, the speech recognition system 270 generates the speech grammar corresponding to the profile specified for the application the user is adding speech recognition.

In step 435, the speech grammar information is presented to the user and in step 440, the speech recognition system 270 determines whether the contents of the user defined profile information is proper grammar or not. If information in the application-specific profile is not proper grammar, the speech recognition system 270 converts the profile contents into proper grammar in step 445. Otherwise, the speech recognition system 270 determines what action to take based on the profile information in step 450.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system comprising:
  a processor;
  a memory storage unit;
  a plurality of user applications;
  an operating system comprising a kernel, said kernel comprising a plurality of kernel modules; and
  a speech recognition system for dynamically encoding a plurality of editable profile information representative of audio signals to be translated into text to be added to said plurality of user applications, the plurality of editable profile information is in a form that is user accessible and modifiable, such that modifications of the editable profile information does not require access to underlying speech recognition source code to add specific speech features for any one of the plurality of user applications,
  wherein a user provides a custom override profile information to replace a subset of grammar rules in one of the plurality of editable profile information that is associated with a combination of one of the plurality of user applications and the user.

2. The computer system of claim 1, wherein said plurality of user applications are graphic user interface applications.

3. The computer system of claim 2, further comprising a speech agent for processing said editable profile information.

4. The computer system of claim 3, wherein said speech agent further reads said editable profile information for a particular one of said plurality of user applications to drive that application based on a user provided spoken commands.

5. The computer system of claim 4, further comprising accessibility framework to enable the speech recognition system perform applications-specific speech operations.

6. The computer system of claim 5, wherein said accessibility framework further permits said speech agent to determine what speech actions may be implemented by each one of said plurality of user applications and events required to cause said actions.

7. The computer system of claim 6, wherein said speech recognition system comprises a profile generation module to generate the editable profile information.

8. The computer system of claim 7, wherein said editable profile information is user defined to include a list of words and phrases specific to said user's use.

9. The computer system of claim 8, wherein said list of words and phrases define application-specific speech grammar.

10. The computer system of claim 9, wherein said user defined profile information further comprises a list of actions to be taken in an application when said user utters a speech command.

11. The computer system of claim 10, wherein said speech recognition system further comprises a grammar customization module for enabling said user customize said profile information to make words spoken by said, user more understandable.

12. The computer system as recited in claim 1, wherein the operating system is in communication with a speech subsystem to provide speech recognition capability to the user.

13. The computer system as recited in claim 12, wherein the speech recognition system interfaces with the speech subsystem without a change in programming code contained in any one of the application plurality of applications.

14. The computer system as recited in claim 13, further comprising as audio input device to enable a user to interact with the computer system through an audio command.

15. The computer system as recited in claim 14, wherein the speech recognition system further comprising a custom module to create a customized speech recognition profile by customizing the editable profile information so as to make the audio command more understandable to the computer system.

16. The computer system as recited in claim 15, wherein the user has a plurality of customized speech recognition profiles to interact with the plurality of user applications.

17. The computer system as recited in claim 16, wherein the audio command is inputted to the operating system through the audio input device, the speech subsystem transfers the audio command to the speech recognition system including a conversion module to convert the audio command to a text command using a selected one of the plurality of customized speech recognition profiles.

18. The computer system as recited in claim 17, wherein the customized speech recognition profile includes a list of words and phrases specific to the user.

19. A computer system including a processor, a memory storage unit, and an application, comprising:
  an operating system in communication with a speech subsystem to provide speech recognition capabilities to a user of the computer system;
  a speech recognition system that provides speech-enabling capability to the application, wherein the speech recognition system interfaces with the speech subsystem to provide the application access to the speech subsystem without a change in a programming code of the application, the speech recognition system including,
    a grammar generation module to generate speech recognition grammar and speech action, wherein the speech action is an operation executed in the application when the user utters an audio command;
    a profile generation module to generate a speech recognition profiles, that is representative of audio signals to be translated into text, including the speech recognition grammar and the speech action for the application, wherein a custom override speech recognition profile is provided by the user to replace a subset of grammar rules defined in the speech recognition profile and the speech recognition profile is tied to a combination of the user and the application;
  a speech agent to read the speech recognition profile for a combination of the user and the application; and
  an accessibility framework to determine that the speech action is permissible by the application and to control the application based on the audio command.

20. The computer system as recited in claim 19, wherein the accessibility framework further comprises a logic to permit the speech agent to determine what speech actions may be implemented by the application.

21. The computer system as recited in claim 20, wherein the accessibility framework further comprises a logic to permit the speech agent to determine what events required to cause the speech action.

22. The computer system as recited in claim 19, wherein the speech recognition profile is customized to make spoken words unique to the user understandable to the computer system.

23. The computer system as recited in claim 22, further comprising a custom module to create a customized speech recognition profile by customizing the speech recognition profile so as to make the audio command more understandable to the computer system.

24. The computer system as recited in claim 23, wherein the user has a plurality of customized speech recognition profiles to interact with the application.

25. The computer system as recited in claim 24, wherein the audio command is inputted to the operating system through an audio input device, the operating system speech subsystem transfers the command to the speech recognition system including a conversion module to convert the audio command to a text command using a selected one of the plurality of customized speech recognition profiles.

26. The computer system as recited in claim 23, wherein the customized speech recognition profile include a list of words and phrases specific to the user.

* * * * *